D. E. ROSS.
STEERING GEAR.
APPLICATION FILED MAR. 7, 1921.
1,429,102.
Patented Sept. 12, 1922.
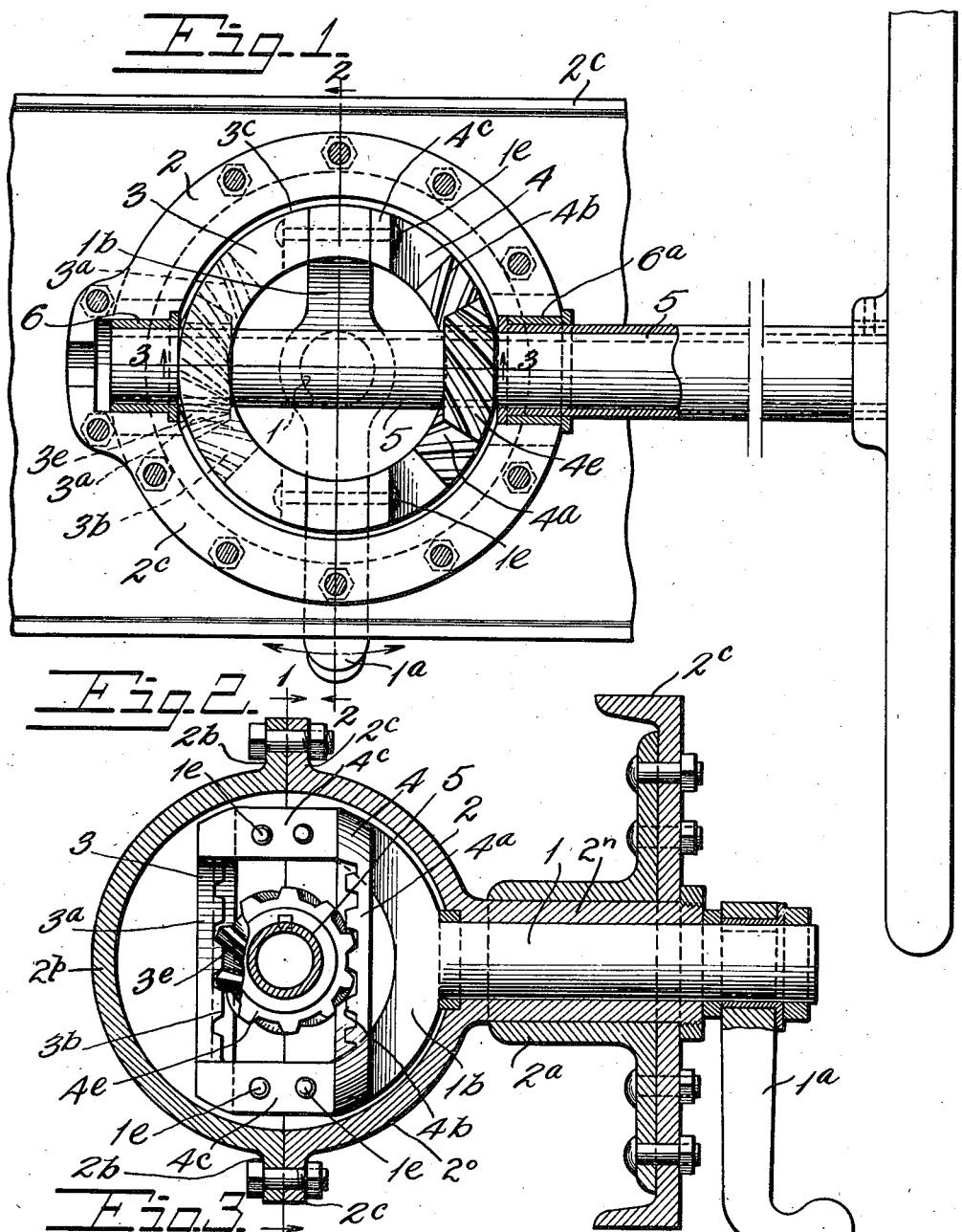
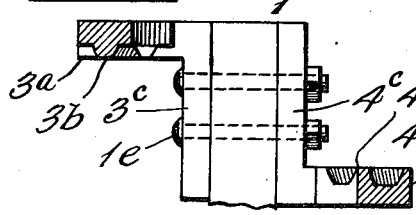

Patented Sept. 12, 1922.

1,429,102

UNITED STATES PATENT OFFICE.

DAVID E. ROSS, OF LAFAYETTE, INDIANA, ASSIGNOR TO ROSS GEAR & TOOL COMPANY, OF LAFAYETTE, INDIANA, A CORPORATION OF INDIANA.

STEERING GEAR.

Application filed March 7, 1921. Serial No. 450,464.

*To all whom it may concern:*

Be it known that I, DAVID E. ROSS, a citizen of the United States, residing at Lafayette, in the county of Tippecanoe and State of Indiana, have invented certain new and useful Improvements in Steering Gears; and I hereby declare that the following is a full, clear, and exact description thereof, reference being had to the accompanying drawings, which form part of this specification.

This invention is an improvement in steering gears for automobiles, boats and the like. Its object is to provide a simple, strong steering gear in which motion is transmitted direct from the steering shaft to the rocker shaft in a powerful and efficient manner.

The invention in brief comprises a rocker shaft; oppositely disposed segments connected therewith and facing in opposite directions and lying in a plane at right angles to the plane of the axis of the rocker shaft, and which segments also lie on opposite sides of the axis of the steering shaft, a steering shaft lying at right angles to the rocker shaft; and similar but opposed helical gears which respectively mesh with the said toothed segments and impart similar movements in opposite directions to the said segment when the steering shaft is turned.

In the accompanying drawings I have illustrated one embodiment of the invention, and will explain the invention with reference to said drawings, and summarize in the claims the essentials of the invention and the novel features of construction and novel combinations of parts for which protection is desired.

In said drawings:

Figure 1 is a partly sectional view of the steering gear on the line 1—1, Fig. 2, with part of the casing removed.

Fig. 2 is a transverse section on the line 2—2, Fig. 1, showing some parts in elevation.

Fig. 3 is a fragmentary detail sectional view on the line 3—3, Fig. 1 looking in the direction of the arrows.

As shown the rocker shaft 1 is mounted in a casing which may be of any suitable construction, and fastened to the vehicle, on which the gear is to be used, by any suitable means; as by a bracket $2^a$ attached to a beam $2^c$ of the chassis of a vehicle.

The steering arm $1^a$ may be of any desired construction and connected in any suitable manner to the outer end of this rocker shaft preferably attached to it by the means shown in my Patent No. 1,136,557, dated April 20, 1915.

On or secured to the inner end of the rocker shaft is a transverse head or yoke $1^b$, each arm of which extends about 90° from the rocker shaft.

On or attached to the end of this head, at one side thereof, and projecting therefrom at right angles to the axis of the shaft, is an approximately semi-circular bracket 3 carrying a preferably spirally toothed segment $3^a$. Attached to the said head at the side opposite segment 3 is a similar but opposed bracket 4 which projects at right angles to the axis of the shaft and carries a similarly toothed segment $4^a$. The segments $3^a$, $4^a$ are oppositely faced, but are similarly formed or provided with preferably long spiral teeth $3^b$, $4^b$. The brackets 3 and 4 may be attached to the head $1^b$ in any suitable manner. As shown they are preferably provided with ears $3^c$ and $4^c$ at their ends (see Figs. 1 and 3) which are attached to opposite sides of the ends of the head $1^b$ by means of rivets $1^e$ as shown, but may be otherwise secured thereto.

The two spirally toothed segments $3^b$, $4^b$ are respectively adapted to mesh with oppositely facing helical or spiral bevel gears or pinions $3^e$, $4^e$ which are keyed, or otherwise rigidly fastened, on the steering shaft 5. The gears $3^e$, $4^e$ are respectively angularly threaded right hand and left hand; and the segments $3^b$, $4^b$ with which they are engaged are correspondingly oppositely threaded. In this construction the thrust or reaction between the gear $3^e$ and segment $3^b$ on the one hand, and the segment $4^e$, $4^b$ on the other hand, counteract or counterbalance each other, that is, the thrust of gear $3^e$ is counterbalanced or counteracted by the thrust of the gear $4^e$. This obviates the necessity of having elaborate thrust bearings for the shaft 5; and also doubles the effective angular gear tooth surfaces operating to transmit motion from the shaft 5 to shaft 1.

The shaft 5 lies at right angles to the rocker shaft 1 as shown, but may be set at any desired inclination to the vertical when the shaft 1 is horizontal. The shaft 5 may be journaled in suitable bearings in the casing 2. As shown this casing has a bearing $2^n$ for shaft 1 and the bearing has a semi-spherical portion $2^o$ on its inner end to which is attached an opposed semi-spherical portion $2^p$; these portions $2^o$, $2^p$ may be provided with peripheral flanges $2^c$, $2^b$ on their meeting edges bolted together as indicated in Figs. 1 and 2 of the drawings. These portions $2^o$, $2^p$ may be provided with bearings of any suitable kind for the steering shaft 5, the bearings being only conventionally shown at 6 and $6^a$ in Fig. 1.

The steering shaft 5 may be tubular and when applied to an automobile the control rods can pass through this shaft and be connected to the usual operating devices on the steering wheel on the upper end of the shaft, and by the usual connections to the devices to be operated below the casing 2.

It will be seen that the steering shaft 5 extends between the segments $3^a$, and $4^a$; that the segment $3^a$ lies at one side of the shaft 5 and the segment $4^a$ at the other side thereof; consequently the similar rotative movements of the gears $3^e$, $4^e$ meshing with the segments $3^a$, $4^a$ impart a like extent of rotative movement to the rocker shaft 1 and in the same direction and the thrust on gear $3^e$ is counterbalanced by the thrust on gear $4^e$ and the effective extent of angular gear tooth engagement between shaft 5 and shaft 1 is doubled. The rocker shaft 1 and segments $3^a$, $4^a$ can have a movement of approximately 80° in the casing. The spiral teeth on the segments $3^a$, $4^a$ and the spiral teeth of the gears $3^e$, $4^e$ may be of any desired angular pitch; which will permit the steering shaft to be properly turned to shift the rocker shaft in the desired direction.

Referring to Fig. 1, it will be seen that when the steering shaft 5 is turned the gears $3^e$ and $4^e$ will be turned therewith and through their engagement with the segments $3^a$ and $4^a$ will turn the rocker shaft 1 with greater or less relative speed according to the angularity of the threads on the gears and segments; and any rotation of the shaft 5 will cause a corresponding but lesser extent of rotative movement of the rocker shaft 1; the change of motion being effected immediately and directly by the engagement of the opposed helical gears $3^e$, $4^e$ with the opposed helical segments $3^a$, $4^a$.

I claim:

1. In a steering gear, a rocker shaft, a steering shaft member approximately at right angles thereto, a pair of oppositely disposed toothed segments attached to the inner end of the rocker shaft and lying on opposite sides of the axis of said shaft, and also on opposite sides of the axis of the steering shaft, and gears on the steering shaft member respectively meshing with the related one of said segments.

2. In a steering gear as set forth in claim 1, a casing enclosing the said segments and gears and provided with bearings for the rocker shaft and the steering shaft, substantially as described.

3. In a steering gear, a rocker shaft, a steering shaft approximately at right angles thereto, a head on said rocker shaft, a pair of oppositely disposed oppositely facing toothed segments attached to the said head and lying on opposite sides of the axis of the rocker shaft and also on opposite sides of the axis of the steering shaft and gears on the steering shaft disposed at opposite sides of the axis of the rocker shaft and respectively meshing with the related one of said segments.

4. In a steering gear, as set forth in claim 3, a casing enclosing the said segments and gears and provided with bearings for the rocker shaft and the steering shaft, substantially as described.

5. In a steering gear, a rocker shaft having a yoke head, a pair of oppositely disposed and oppositely facing toothed segments connected with opposite sides of the rocker shaft head and lying in planes at right angles to the plane of the axis of the rocker shaft, a steering shaft member extending between said segments, and gears on said steering shaft member respectively meshing with the said segments.

6. In a steering gear as set forth in claim 5, a casing enclosing the said segments and gears, and provided with bearings for the rocker shaft and the steering shaft member, substantially as described.

7. In a steering gear, a rocker shaft having a yoke shaped head, a pair of oppositely disposed and oppositely facing spirally toothed segments connected with opposite sides of the said head and lying in planes at right angles to the plane of the axis of the rocker shaft; a steering shaft extending between said segments and lying in a plane approximately perpendicular to the rocker shaft, and spirally toothed gears on said steering shaft respectively meshing with the said segments.

8. In a steering gear as set forth in claim 7, a casing enclosing the said segments and gears, and provided with bearings for the rocker shaft and the steering shaft, substantially as described.

9. In a steering gear, a rocker shaft having a bifurcated head, a bracket attached to one side of said head and projecting in a plane at right angles to the plane of the axis of the rocker shaft, a second bracket attached to the opposite side of said head and lying in a plane at right angles to the axis of the rocker shaft, similarly toothed segments on said brackets; a steering shaft extending through said head and between the said brackets and attached segments and spiral gears fixed to said steering shaft at opposite sides of the axis of the rocker shaft and respectively meshing with the adjacent spirally toothed segments substantially as described.

10. In a steering gear as set forth in claim 9, a casing enclosing the said segments and gears and provided with bearings for the rocker shaft and the steering shaft, substantially as described.

In testimony that I claim the foregoing as my own, I affix my signature.

DAVID E. ROSS.